United States Patent
Lee et al.

(10) Patent No.: US 8,031,818 B2
(45) Date of Patent: Oct. 4, 2011

(54) METHOD AND APPARATUS FOR FINE FREQUENCY SYNCHRONIZATION IN WIRELESS BROADBAND (WIBRO) SYSTEM WITHOUT USING GLOBAL POSITIONING SYSTEM (GPS) RECEIVER

(75) Inventors: Sung-won Lee, Suwon-si (KR);
Young-gon Choi, Suwon-si (KR);
Jung-ho Kim, Suwon-si (KR);
Yong-sung Roh, Icheon-si (KR);
Hae-lyong Kim, Daejeon-si (KR);
Nam-shik Kim, Yongin-si (KR);
Hyun-cheol Park, Daejeon-si (KR);
Joong-soo Ma, Daejeon-si (KR)

(73) Assignees: Samsung Electronics Co., Ltd., Suwon-si (KR); ICU Research and Industrial Cooperation Group, Daejeon-si (KR)

( * ) Notice: Subject to any disclaimer, the term of this patent is extended or adjusted under 35 U.S.C. 154(b) by 824 days.

(21) Appl. No.: 12/026,108

(22) Filed: Feb. 5, 2008

(65) Prior Publication Data
US 2009/0041095 A1 Feb. 12, 2009

(30) Foreign Application Priority Data
Aug. 10, 2007 (KR) .................. 10-2007-0080807

(51) Int. Cl.
*H04L 27/06* (2006.01)
(52) U.S. Cl. ...................................... 375/344
(58) Field of Classification Search .............. 375/344, 375/150, 260
See application file for complete search history.

(56) References Cited

U.S. PATENT DOCUMENTS

| | | | |
|---|---|---|---|
| 2004/0151142 A1 | 8/2004 | Li et al. | |
| 2006/0104257 A1 | 5/2006 | Laroia et al. | |
| 2007/0004337 A1 | 1/2007 | Biswas et al. | |
| 2008/0232343 A1* | 9/2008 | Nguyen et al. | 370/347 |

FOREIGN PATENT DOCUMENTS

| | | |
|---|---|---|
| KR | 2004-0099875 A | 12/2004 |
| KR | 10-0596500 B1 | 6/2006 |
| KR | 2006-0067034 A | 6/2006 |
| KR | 2006-0071072 A | 6/2006 |
| KR | 10-2006-0112270 A | 10/2006 |
| WO | 2006-065016 A1 | 6/2006 |
| WO | 2006-068347 A1 | 6/2006 |

OTHER PUBLICATIONS

Paul H. Moose; "A Technique for Orthogonal Frequency Division Multiplexing Frequency Offset Correction", IEEE Trans. Communications, vol. 42, No. 10; Oct. 1994, pp. 2908-2914.

* cited by examiner

*Primary Examiner* — Kevin Kim
(74) *Attorney, Agent, or Firm* — Sughrue Mion, PLLC

(57) ABSTRACT

Provided is a fine frequency synchronization method of a WiBro system, and particularly, a fine frequency synchronization method which measures a spread degree of a received signal of an adjacent subcarrier using orthogonality of PN sequences and thereby estimates a frequency offset, in a base station or a wireless repeater without using a GPS receiver. The fine frequency synchronization method includes: (a) performing despreading on received adjacent subcarrier sequences, using a PN sequence transmitted from a transmitting party; (b) obtaining ratios of correlative values obtained by the despreading; and (c) estimating a frequency offset on the basis of the ratio of correlative values. Accordingly, fine frequency offset estimation with relatively low complexity is possible without using a GPS receiver in a WiBro environment where interference signals of other base stations or repeaters exist.

10 Claims, 8 Drawing Sheets

METHOD AND APPARATUS FOR FINE FREQUENCY SYNCHRONIZATION IN WIRELESS BROADBAND (WIBRO) SYSTEM WITHOUT USING GLOBAL POSITIONING SYSTEM (GPS) RECEIVER

CROSS REFERENCE TO RELATED APPLICATIONS

This application claims priority from Korean Patent Application No. 10-2007-0080807, filed on Aug. 10, 2007, the disclosure of which is incorporated herein in its entirety by reference.

BACKGROUND OF THE INVENTION

1. Field of the Invention

The present invention relates to a method and apparatus for fine frequency synchronization which are used in a wireless broadband (WiBro) system, and more particularly, to a method and apparatus for highly precisely estimating a fine frequency offset without using a Global Positioning System (GPS) receiver, in an environment where signals of other base stations or repeaters exist as interference signals in a frame signal which is received through a wireless link.

2. Description of the Related Art

In a next-generation mobile communication system, a subminiature base station and an intelligent wireless repeater have to be necessarily introduced in order to reduce costs required for adding base stations, expand the radius of a service cell, and increase a capacity that is to be assigned to congested regions. In order to allow an apparatus which is newly added to a system to transmit high quality data to a terminal, wireless repeater network synchronization and system clock synchronization become important technical components.

Particularly, in order to allow a subminiature base station and a wireless repeater to transmit high quality data to a terminal that is within a service region, in a wireless broadband (WiBro) system which is being developed as a next-generation mobile communication system, stable time synchronization and frequency synchronization have to be maintained. Here, in order to achieve precise time synchronization and frequency synchronization, it is preferable to receive and use signals of a GPS satellite including an atomic clock. However, when all of a plurality of wireless apparatuses time maintain time synchronization and frequency synchronization using GPS receivers, problems exist in that costs increase greatly and installation of the wireless apparatuses is limited because no GPS signal can be received in most indoor places.

In order to resolve the problems, there can be considered a method of acquiring time and frequency synchronization on the basis of a WiBro frame signal which is received through a wireless channel from a target base station (a base station which is in an optimum signal reception state among adjacent base stations), without using a GPS receiver. For time and frequency synchronization without using a GPS receiver, a general Orthogonal Frequency-Division Multiplexing (OFDM) synchronization process can be applied.

Paul H. Moose has proposed a method for high-speed frame signal detection and time and frequency synchronization based on a general OFDM transmission method, in "A Technique for Orthogonal Frequency Division Multiplexing Frequency Offset Correction," IEEE Trans. Communications, vol. 42, No. 10, October 1994, pp 2908-2914. The Moose's method uses correlative values in a time domain. The technical concept of the Moose's method will be simply described below.

FIG. 1 is a view for explaining a time synchronization method based on the Moose's method.

Referring to FIG. 1, two training symbols (that is, first and second training symbols y(n) and y(n+1)) with the same complex value, each having a length of L, are transmitted as a preamble, and a receiving terminal sets a time window having a length of 2 L for synchronization, and then acquires time synchronization using a timing metric M(d) defined in Equation 1.

$$M(d) = \frac{|P(d)|^2}{(R(d))^2}, \quad (1)$$

where d represents a time index for the first training symbol y(n).

Here, P(d) is a correlative value in a time domain, and represented as a sum of products between training symbols that are successively received, according to Equation 2.

$$P(d) = \sum_{m=0}^{L-1} y*(d+m)y(d+m+L) \quad (2)$$

R(d) is an energy value of the second training symbol y(n+1) which is received, and represented by Equation 3, below.

$$R(d) = \sum_{m=0}^{L-1} |y(d+m+L)|^2 \quad (3)$$

Meanwhile, after time synchronization is acquired by Equation 1, a frequency offset is estimated, using optimal time synchronization and Equation 2 which represents the correlative value in the time domain. The frequency offset is represented by Equation 4.

$$\epsilon = \frac{1}{2\pi L} \text{angle}(P(d)) \quad (4)$$

Now, the time synchronization method based on the Moose's method using the correlative value in the time domain, as described above, is applied to the WiBro system.

In the case of the WiBro system, in order to allow a receiving terminal to acquire time and frequency synchronization, a first OFDM symbol of a frame is transmitted as a preamble. The preamble consists of three types of preamble segments each having 284 subcarriers. As such, since the first OFDM symbol of the frame consists of three identical training symbols in a time domain, the general OFDM synchronization method (that is, the Moose's method) as described above can be applied to two training symbols that are adjacent to each other.

That is, time synchronization can be acquired by applying the timing metric M(d) defined in Equation 1 to two training symbols that are adjacent to each other. Also, by applying Equation 4 of estimating a frequency offset using the acquired optimal time synchronization and the correlative value (Equation 2) in the time domain, frequency synchronization can be acquired.

However, it is difficult to apply the frequency synchronization method based on the Moose's method to an actual WiBro environment in which a variety of interference signals exist. The reason is because a signal which is received through a wireless channel is a sum of a variety of interference signals that are received from other peripheral base stations or repeaters as well as from a target base station, and thus a frequency offset cannot be precisely estimated due to the influence of the interference signals. Particularly, in the case of a repeater which is installed in a hot-spot region of an inner city, the influence of such interference signals increases greatly.

Actual requirements for frequency synchronization of a WiBro wireless repeater are as follows. A requirement for reference frequency accuracy of a base station is about 2 PPM, and inter base station frequency synchronization accuracy which is required for hand-off is about 1% of an OFDM subcarrier interval. That is, inter base station frequency synchronization accuracy corresponding to an offset of about 97 Hz is required.

Accordingly, frequency synchronization accuracy for each base station, which is required to support hand-off, becomes about 48 Hz. As such, in order to allow a wireless repeater to relay signals of a base station and transmit high quality data to a terminal which is within a service region and particularly to support hand-off, precise frequency synchronization which stably satisfies the frequency synchronization requirement (that is, the frequency synchronization accuracy of about 48 Hz) is necessary.

However, when the Moose's method of estimating a frequency offset using correlative values in a time domain, as described above, is applied, a problem exists in that precise frequency offset estimation capable of satisfying frequency synchronization accuracy of about 48 Hz is very difficult, in a WiBro environment where a variety of interference signals exist in a wireless link.

SUMMARY OF THE INVENTION

The present invention provides a method and apparatus for highly precisely estimating a fine frequency offset without using a Global Positioning System (GPS) receiver, in an environment where signals of other base stations or repeaters exist as interference signals.

According to the present invention, there is provided a method for estimating a frequency offset by measuring the spread degree of a received signal in an adjacent subcarrier using orthogonality of Pseudo-Noise (PN) sequences, in a base station or a wireless repeater which does not use a GPS receiver.

According to an aspect of the present invention, there is provided a fine frequency synchronization method of a wireless broadband (WiBro) system without using a Global Positioning System (GPS) receiver, the method including: measuring a spread degree of a received adjacent subcarrier signal, using orthogonality of Pseudo-random Noise (PN) sequences; and estimating a frequency offset on the basis of the spread degree of the received adjacent subcarrier signal.

The estimating of the spread degree of the received adjacent subcarrier signal comprises obtaining correlative values of received adjacent subcarrier signals, using a PN sequence transmitted from a transmitting party, and obtaining the spread degree of the received adjacent subcarrier signal, using ratios of the correlative values.

According to another aspect of the present invention, there is provided a fine frequency synchronization method of a wireless broadband (WiBro) system without using a GPS receiver, the method including: (a) performing despreading on received adjacent subcarrier sequences, using a PN sequence transmitted from a transmitting party; and (b) obtaining ratios of correlative values obtained by the despreading; and (c) estimating a frequency offset on the basis of the ratios of correlative values.

Operation (a) includes: (a1) performing despreading on a received signal of a specific period of a subcarrier corresponding to a target base station, using the PN sequence; (a2) performing despreading on a received signal of a subcarrier set whose subcarrier index is smaller by 1 than a subcarrier index of a subcarrier set of the specific period, using the PN sequence; and (a3) performing despreading on a received signal of a subcarrier set whose subcarrier index is greater by 1 than the subcarrier index of the subcarrier set of the specific period, using the PN sequence.

Operation (b) includes: (b1) obtaining a first correlation ratio between a PN despread value for the subcarrier set of the specific period, and a PN despread value for the subcarrier set whose subcarrier index is smaller by 1 than the subcarrier index of the subcarrier set of the specific period; and (b2) obtaining a second correlation ratio between the PN despread value for the subcarrier set of the specific period, and a PN despread value for the subcarrier set whose subcarrier index is greater by 1 than the subcarrier index of the subcarrier set of the specific period.

Operation (c) includes estimating the frequency offset using the first correlation ratio and the second correlation ratio.

Operation (c) includes storing a first correlation ratio and a second correlation ratio for each frequency offset in advance in a memory, and searching for a frequency offset corresponding to a value which is most approximate to an input first correlation ratio and an input second correlation ratio from the memory.

According to another aspect of the present invention, there is provided a frequency synchronization apparatus of a WiBro system without using a GPS receiver, the apparatus including: a PN despreading unit performing despreading on received adjacent subcarrier sequences, using a PN sequence transmitted from a transmitting party; a correlation ratio calculating unit obtaining ratios of correlative values obtained by the despreading; and an offset estimating unit estimating a frequency offset on the basis of the ratios of correlative values.

The offset estimating unit estimates the frequency offset, using a first correlation ratio between a PN despread value for a subcarrier set of a specific period and a PN despread value for a subcarrier set whose subcarrier index is smaller by 1 than a subcarrier index of the subcarrier set of the specific period, and a second correlation ratio between the PN despread value for the subcarrier set of the specific period and a PN despread value for a subcarrier set whose subcarrier index is greater by 1 than the subcarrier index of the subcarrier set of the specific period.

The offset estimating unit stores a first correlation ratio between a PN despread value for a subcarrier set of a specific period and a PN despread value for a subcarrier set whose subcarrier index is smaller by 1 than a subcarrier index of the subcarrier set of the specific period, and a second correlation ratio between the PN despread value for the subcarrier set of the specific period and a PN despread value for a subcarrier set whose subcarrier index is greater by 1 than the subcarrier index of the subcarrier set of the specific period, in advance, in a memory, and searches for a value which is most approximate to a first correlation ratio and a second correlation ratio which are input to the offset estimating unit, from the memory, thereby obtaining the frequency offset corresponding to the result of the searching.

As described above, according to the present invention, there are provided a method and apparatus for highly precisely estimating a fine frequency offset which is smaller than 48 Hz, without using a GPS receiver, in an environment where signals of other base stations or repeaters exist as interference signals in a frame signal which is received through a wireless link.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

DETAILED DESCRIPTION OF EXEMPLARY EMBODIMENTS

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art.

Figure 1:
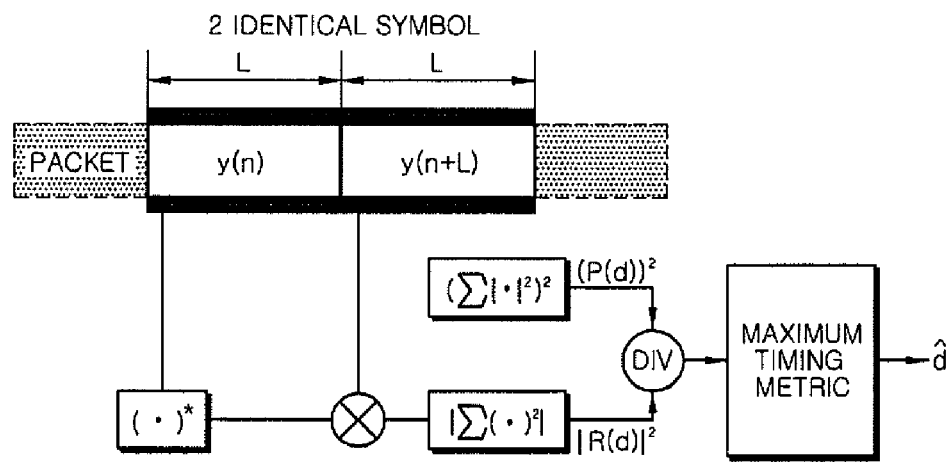
FIG. 1 is a view for explaining a conventional frequency synchronization method based on the Moose's method.

First, before a frequency synchronization method according to the present invention is applied, an existing time synchronization method using correlative values in a time domain is performed. The time synchronization method may be the conventional time synchronization method as described above with reference to FIG. 1. Fast Fourier Transform (FFT) is performed on a signal of an OFDM symbol period in a FFT window which is obtained through time synchronization of a received signal, and thus the received signal is converted into a signal in a frequency domain through the FFT. A wireless broadband (WiBro) system transmits a first OFDM symbol as a preamble for time and frequency synchronization of a receiving terminal. The preamble symbol has the following structure.

Figure 2:
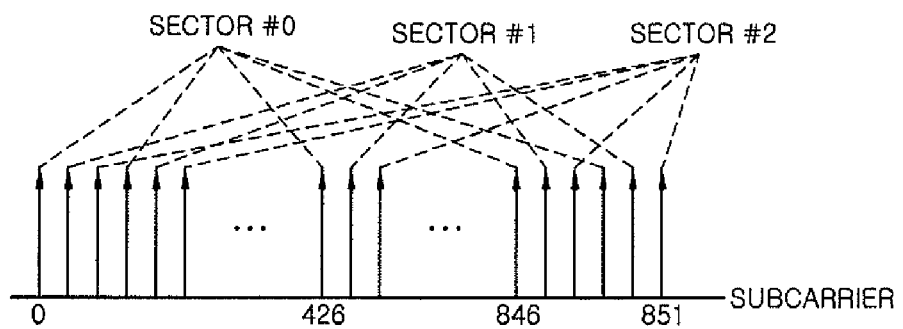
FIG. 2 illustrates a state where Orthogonal Frequency-Division Multiplexing (OFDM) symbols are allocated to subcarriers.
Figure 3A:
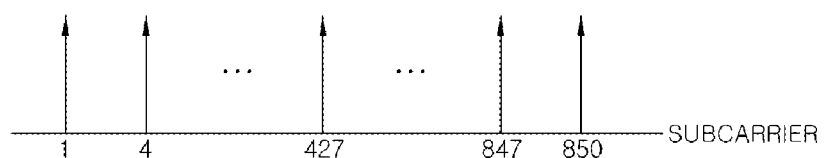
FIGS. 3A through 3D illustrate subcarrier sets that are used to obtain correlative values for frequency offset estimation, according to an embodiment of the present invention.
Figure 3B:
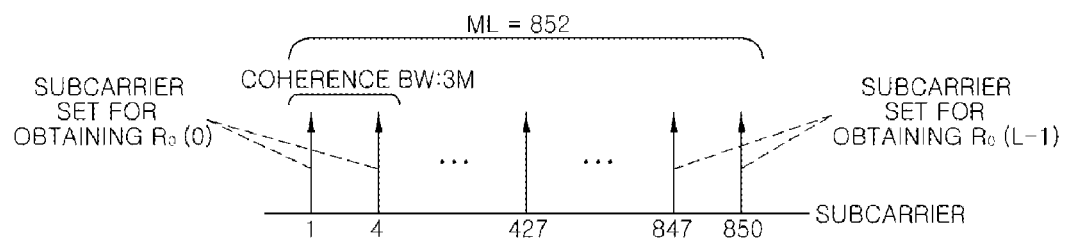
Figure 3C:
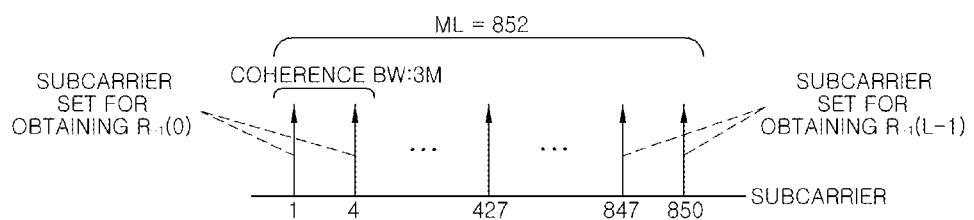
Figure 3D:
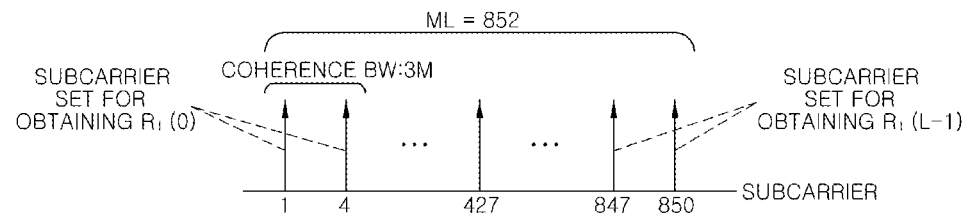

FIG. 2 illustrates a state where OFDM symbols are allocated to subcarriers.

Referring to FIG. 2, a first OFDM symbol includes three types of preamble subsets, that is, Sector #0, Sector #1, and Sector #2. Each preamble subset includes 284 subcarriers, and can be represented as follows.

PreambleCarrierSet=$n+3k$, wherein $n=0, 1,$ and 2 and $k$ is $0, \ldots, 283$.

Sector #0: Carrier-set0(0, 3, ..., 849), including 284 subcarriers.

Sector #1: Carrier-set1(1, 4, ..., 850), including 284 subcarriers.

Sector #2: Carrier-set2(2, 5, ..., 851), including 284 subcarriers.

Hereinafter, the frequency synchronization method using the structure of the preamble subset described above, according to an embodiment of the present invention, will be described in detail according to respective operations.

1. It is assumed that a fine frequency offset of a signal which is received from a base station using an i-th preamble set is $\epsilon_{ti}$, and a frequency offset of a receiving terminal of a base station or a wireless repeater is $\epsilon_r$. A sum of signals which are received from three base stations each using the corresponding preamble set can be represented by Equation 5.

$$y(n) = \sum_{i=0}^{2} \sum_{k \in S^i} H(k)X(k)\exp\left(j\frac{2\pi n(k+\epsilon_{ti})}{N}\right)\exp\left(j\frac{2\pi n\epsilon_t}{N}\right) + \omega(n), \tag{5}$$

where $S^i$ represents an i-th preamble subset, H(k) represents a channel response corresponding to a k-th subcarrier, and X(k) represents a transmission symbol that is transmitted to the k-th subcarrier.

2. It is assumed that a sum of the frequency offset of the signal which is transmitted from the base station (simply, referred to as an i-th base station) using the i-th preamble set and the frequency offset of the receiving terminal of the base station or the wireless repeater is $\epsilon_i$.

$$\epsilon_i = \epsilon_{ti} + \epsilon_r \tag{6}$$

where i represents a base station index, and i ∈ {0, 1, 2}.

The resultant simplified received signal model is expressed by Equation 7.

$$y(n) = \sum_{i=0}^{2} \sum_{k \in S^i} H(k)X(k)\exp\left(j\frac{2\pi n(k+\epsilon_i)}{N}\right) + \omega(n) \tag{7}$$

3. A k-th subcarrier signal which is obtained by performing FFT on a received signal model in which a frequency offset and interference signals of other base stations exist, is expressed by Equation 8.

$$Y(k) = \sum_{i=0}^{2} \sum_{l \in S^i} H(l)X(l)\gamma_{k,\epsilon_i}(l) + W(k), \tag{8}$$

where $\gamma_{k,\epsilon_i}(l)$ represents a degree (that is, an interference coefficient) at which a received signal of a l-th subcarrier belonging to a transmission symbol of the i-th base station interferes the received signal of the k-th subcarrier by the frequency offset of $\epsilon_i$, and a value of $Y_{k,\epsilon_i}(l)$ is expressed by Equation 9.

$$\gamma_{k,\epsilon_i}(l) = \frac{\sin(\pi\epsilon_i)}{N\sin(\pi(l-k+\epsilon_i)/N)} \exp\left(j\frac{\pi\epsilon_i(N-1)}{N}\right) \exp\left(-j\frac{\pi(l-k)}{N}\right) \quad (9)$$

4. A preamble of the WiBro system, as described above, is based on a method in which a Pseudo-Noise (PN) code is modulated by binary phase shifting keying (BPSK) and then transmitted to an OFDM subcarrier corresponding to a preamble set of the corresponding base station. The influences of the symbol X(k) transmitted to the k-th subcarrier on the received symbols Y(k), Y(k−1), and Y(k+1) of k-th, (k−1)-th, and (k+1)-th subcarriers due to the frequency offset of $\epsilon_i$ are expressed by Equation 10.

$$Y(k) = H(k)X(k)\gamma_{k,S^i}(k) + \sum_{i=0}^{2}\sum_{l\in S^i, l\neq k} H(l)X(l)\gamma_{k,\epsilon_i}(l) + W(k), \quad (10)$$

$$Y(k-1) = H(k)X(k)\gamma_{k-1,S^i}(k) + \sum_{i=0}^{2}\sum_{l\in S^i, l\neq k} H(l)X(l)\gamma_{k-1,\epsilon_i}(l) + W(k-1), \text{ and}$$

$$Y(k+1) = H(k)X(k)\gamma_{k+1,S^i}(k) + \sum_{i=0}^{2}\sum_{l\in S^i, l\neq k} H(l)X(l)\gamma_{k+1,\epsilon_i}(l) + W(k+1),$$

where $\gamma_{k,\epsilon_i}(k)$, $Y_{k+1,\epsilon_i}(k)$, and $\gamma_{k-1,\epsilon_i}(k)$ can be rewritten to Equation 11 according to Equation 9.

$$\gamma_{k,\epsilon_i}(k) = \frac{\sin(\pi\epsilon_i)}{N\sin(\pi\epsilon_i/N)} \exp\left(j\frac{\pi\epsilon_i(N-1)}{N}\right), \quad (11)$$

$$\gamma_{k+1,\epsilon_i}(k) = \frac{\sin(\pi\epsilon_i)}{N\sin(\pi(\epsilon_i-1)/N))} \exp\left(j\frac{\pi\epsilon_i(N-1)}{N}\right)\exp\left(j\frac{\pi}{N}\right), \text{ and}$$

$$\gamma_{k-1,\epsilon_i}(k) = \frac{\sin(\pi\epsilon_i)}{N\sin(\pi(\epsilon_i+1)/N))} \exp\left(j\frac{\pi\epsilon_i(N-1)}{N}\right)\exp\left(-j\frac{\pi}{N}\right)$$

Hereinafter, in order to support the understanding of the following operations 5, 6, and 7 to obtain correlative values for frequency offset estimation according to the present invention, an example of a subcarrier set will be described.

FIGS. 3A through 3D illustrate subcarrier sets that are used to obtain correlative values for frequency offset estimation, according to an embodiment of the present invention. FIGS. 3A through 3D illustrate a case where a target base station uses a subcarrier set Sector #1. A process of obtaining correlative values for frequency offset estimation according to an embodiment of the present invention will be described with reference to FIGS. 3A through 3D, below.

5. As illustrated in FIGS. 3A through 3D, it is assumed that a coherence bandwidth (BW) is set to a subcarrier interval of 3 M, and the entire available BW period is divided into L coherence BWs. It is assumed that a channel value of a l-th section ($l \in \{0, 1, \ldots, L-1\}$) is a representative value $\overline{H}(l)$. In order to obtain a correlative value, despreading is performed on a received signal $S_l^i$ (ok?) in the specific period of a subcarrier corresponding to the i-th target base station, using a PN sequence C*(k) which is transmitted from a transmitting party. Here, since a PN sequence C*(k) having orthogonality is used in the despreading process, interferences by other base stations can be minimized.

$$R_0 = \sum_{k\in S^i} Y(k)C^*(k) = M\overline{H}(l)\gamma_k(k) + I(k) + Z(k) \quad (12)$$

6. Like the above-described operation 5, the despreading process is also performed on received signals (that is, adjacent subcarriers) in a subcarrier set whose subcarrier index is smaller by 1 and a subcarrier set whose subcarrier index is greater by 1, than the subcarrier index of the subcarrier set in the specific period. At this time, likewise, since a PN sequence having orthogonality is used during the despreading process, interferences by other base stations can be minimized.

$$R_{-1} = \sum_{k\in S^i} Y(k-1)C^*(k) \quad (13)$$

$$= M\overline{H}(l)\gamma_{k-1}(k) + I(k-1) + Z(k-1),$$

and $$R_1 = \sum_{k\in S^i} Y(k+1)C^*(k)$$

$$= M\overline{H}(l)\gamma_{k+1}(k) + I(k+1) + Z(k+1)$$

7. When the entire BW period through which the preamble of the WiBro system is transmitted is divided into L coherence BWs, the total number of despread values that are obtained in the above-described operations 4 and 5 is L. The despread values can be expressed by Equation 14.

$$R_0(l) = \sum_k Y(3Ml+k)C^*(3Ml+k), \quad (14)$$

$$R_{-1}(l) = \sum_k Y(3Ml+k-1)C^*(3Ml+k), \text{ and}$$

$$R_1(l) = \sum_k Y(3Ml+k+1)C^*(3Ml+k),$$

where $l \in \{0, 1, \ldots, L-1\}$.

8. In order to estimate a frequency offset, ratios of the despread values that are obtained by Equation 14 are obtained. A frequency offset $\epsilon_i$ of a signal which is transmitted to each base station can be specifically determined on the basis of the ratios of correlative values, as follows.

$$\hat{M}_o = \frac{1}{L}\sum_{l=0}^{L-1}\frac{R_{-1}(l)}{R_0(l)} \quad (15)$$

$$\approx \frac{\gamma_{k-1,\epsilon_i}(k)}{\gamma_{k,\epsilon_i}(k)}$$

$$= \frac{\sin(\pi\epsilon_i/N)}{\sin(\pi(\epsilon_i+1)/N)}\exp\left(-j\frac{\pi}{N}\right), \text{ and}$$

-continued $$\hat{M}_o = \frac{1}{L}\sum_{l=0}^{L-1}\frac{R_{-1}(l)}{R_0(l)}$$

$$\approx \frac{\gamma_{k+1,\epsilon_i}(k)}{\gamma_{k,\epsilon_i}(k)}$$

$$= \frac{\sin(\pi\epsilon_i/N)}{\sin(\pi(\epsilon_i-1)/N)}\exp\left(j\frac{\pi}{N}\right)$$

Meanwhile, a process of obtaining the frequency offset $\epsilon_i$ using the ratios of correlative values will be described in detail, below.

9. $\hat{M}_0 \cdot \hat{M}_1$ is obtained using the ratios of correlative values which are obtained by Equation 15.

$$\hat{M}_o \cdot \hat{M}_1 = \frac{\sin(\pi\epsilon_i/N)}{\sin(\pi(\epsilon_i+1)/N)}\exp\left(-j\frac{\pi}{N}\right) \cdot \quad (16)$$
$$\frac{\sin(\pi\epsilon_i/N)}{\sin(\pi(\epsilon_i-1)/N)}\exp\left(j\frac{\pi}{N}\right)$$
$$= \frac{\sin^2(\pi\epsilon_i/N)}{\sin(\pi(\epsilon_i+1)/N)\cdot\sin(\pi(\epsilon_i-1)/N)}$$
$$= \frac{\sin^2(\pi\epsilon_i/N)}{\sin^2(\pi\epsilon_i/N)\cdot\cos^2(\pi/N) - \cos^2(\pi\epsilon_i/N)\cdot\sin^2(\pi/N)}$$

10. Then, $$\frac{1}{\hat{M}_o \cdot \hat{M}_1}$$

is obtained using Equation 16, as follows.

$$\frac{1}{\hat{M}_o \cdot \hat{M}_1} = \frac{\sin^2(\pi\epsilon_i/N)\cdot\cos^2(\pi/N) - \cos^2(\pi\epsilon_i/N)\cdot\sin^2(\pi/N)}{\sin^2(\pi\epsilon_i/N)} \quad (17)$$
$$= \cos^2(\pi/N) - \sin^2(\pi/N)\cdot\frac{1}{\tan^2(\pi\epsilon_i/N)}$$

11. Equation 17 can be rewritten to Equation 18, so that the frequency offset $\epsilon_i$ can be obtained.

$$\epsilon_i = \frac{N}{\pi}\tan^{-1}\sqrt{\frac{\sin^2(\pi/N)\hat{M}_0 \cdot \hat{M}_1}{\cos^2(\pi/N)\hat{M}_0 \cdot \hat{M}_1 - 1}} \quad (18)$$

12. Meanwhile, another method of obtaining a frequency offset $\epsilon_i$ is to obtain a frequency offset $\epsilon_i$ by storing correlation ratios $M_0$ and $M_1$ which are obtained according to Equation 15, in advance in a memory, and searching for a value which is most approximate to $\hat{M}_0$ and $\hat{M}_1$ obtained in operation 8 from the memory.

A method of estimating a frequency offset using correlation ratios for frequency offset values of received adjacent signals has been described above. The method can be simply summarized, as follows.

First, a preparation process for frequency synchronization is as follows.

1) A time synchronization process is performed using correlative values in a time domain before frequency synchronization is performed.

2) FFT is performed on a received signal model in which a frequency offset and interference signals of other base stations exist, so that a subcarrier set is obtained.

Figure 4:
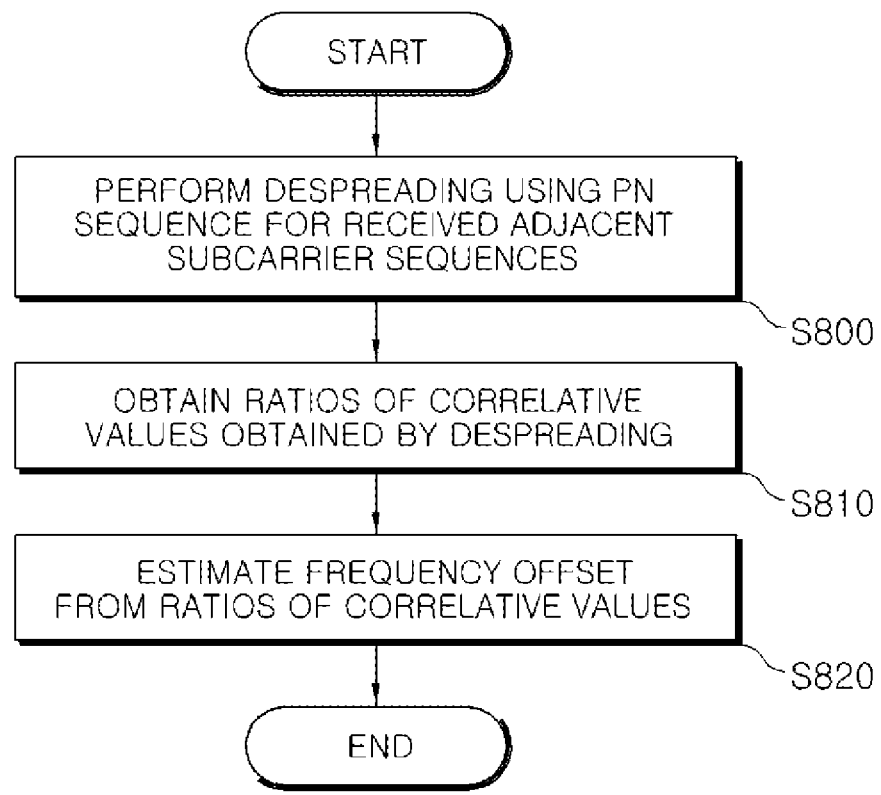
FIG. 4 is flowchart of a frequency synchronization method according to an embodiment of the present invention.

Now, a frequency synchronization process is performed on a received signal of a specific period of a subcarrier corresponding to a target base station. FIG. 4 is a flowchart of a frequency synchronization method according to an embodiment of the present invention. The frequency synchronization method will be described with reference to FIG. 4, below.

3) In order to obtain correlative values for received subcarrier sequences (that is, Y(k), Y(k−1), Y(k+1)) that are adjacent to a received signal of a specific period of a subcarrier corresponding to a target base station, despreading is performed using a PN sequence (operation S800). Correlative values which are obtained through the despreading are represented by $R_0$, $R_1$, and $R_{-1}$ and calculated according to Equation 14. At this time, by performing the despreading using the PN sequence of the target base station, interference signals of other base stations or repeaters, which are included in the received signal, can be minimized.

4) Ratios of the correlative values which are obtained by the despreading are calculated according to Equation 15 (operation S810).

5) A frequency offset is estimated on the basis of the ratios of correlative values. The frequency offset can be estimated using Equation 18, however, the present invention is not limited to this. The frequency offset can be estimated by storing correlation ratios $M_0$ and $M_1$ in advance in a memory and searching for a value which is most approximate to values $\hat{M}_0$ and $\hat{M}_1$ obtained in operation 8 from the memory, as described above.

Hereinafter, the structure of a frequency synchronization apparatus which is installed in a base station or a wireless repeater to which the frequency offset estimation method according to the present invention is applied will be described.

Figure 5:
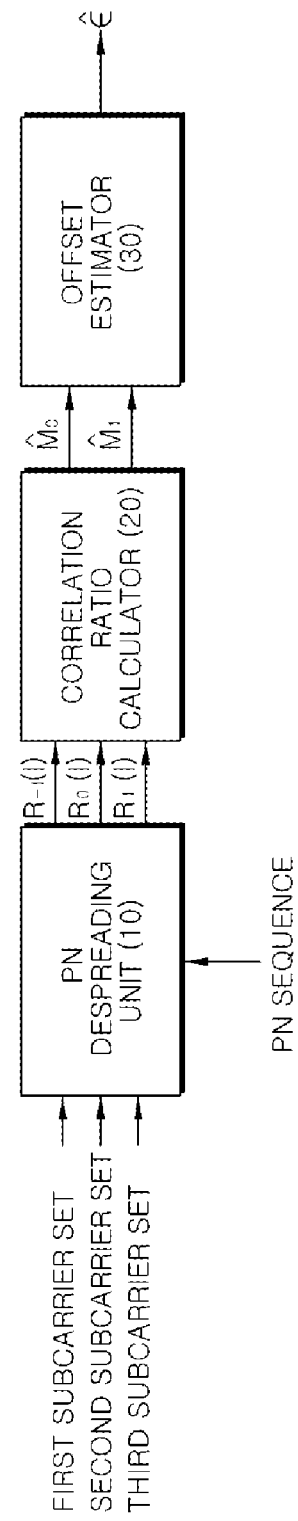
FIG. 5 is a block diagram of a frequency synchronization apparatus according to an embodiment of the present invention.

FIG. 5 is a block diagram of a frequency synchronization apparatus according to an embodiment of the present invention.

Referring to FIG. 5, the frequency synchronization apparatus includes a PN despreading unit 10, a correlation ratio calculator 20, and an offset estimator 30.

The PN despreading unit 10 performs despreading on received adjacent subcarrier sequences, using a PN sequence which is transmitted from a transmitting party, in order to obtain correlative values between adjacent subcarrier sets. At this time, by using a PN sequence of a target base station, interference signals of other base stations can be minimized. The correlation ratio calculator 20 obtains ratios of the correlative values that are obtained by the PN despreading unit 10. The offset estimator 30 estimates a frequency offset on the basis of the ratios of correlative values which are obtained by the correlative value calculator 20.

Figure 6:
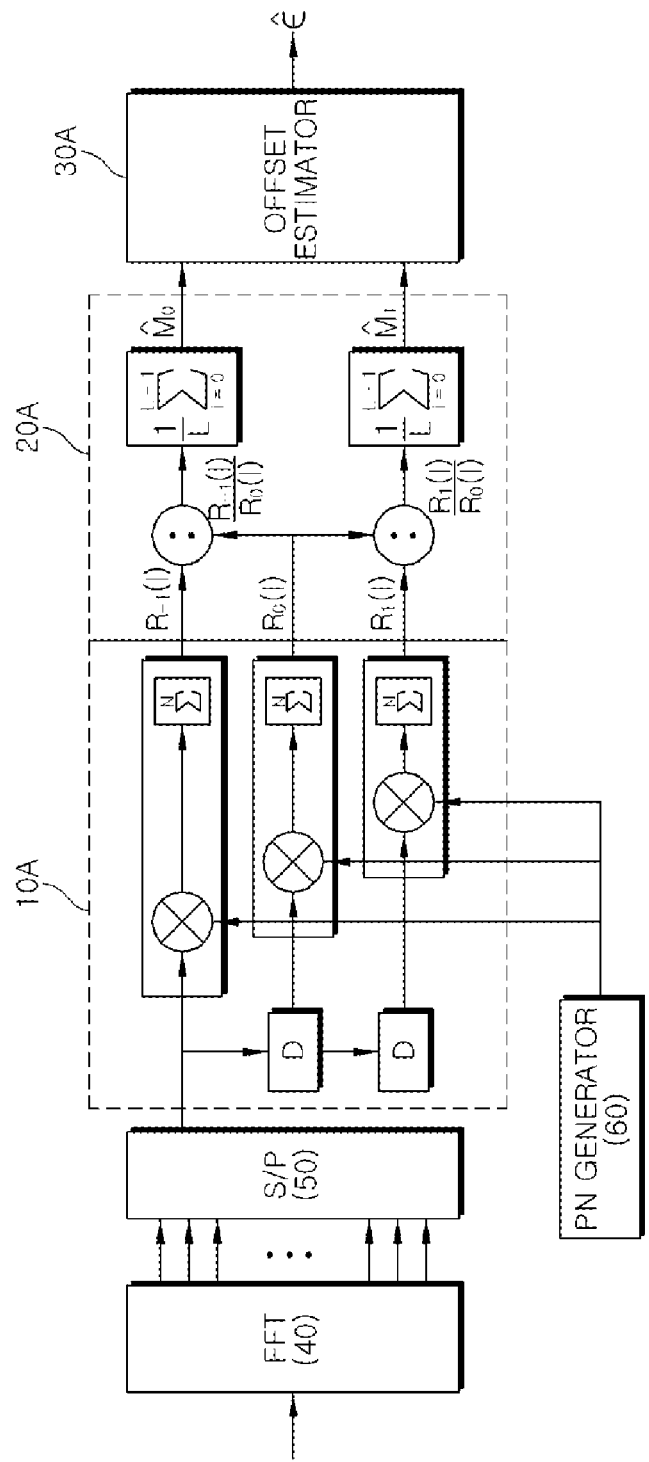
FIG. 6 illustrates an embodiment of the frequency synchronization apparatus illustrated in FIG. 5.

FIG. 6 illustrates an embodiment of the frequency synchronization apparatus illustrated in FIG. 5. Referring to FIG. 6, the frequency synchronization apparatus further includes a FFT unit 40 and a serial-to-parallel (S/P) converter 50. The FFT unit 40 performs FFT on a received signal which is subjected to time synchronization using correlative values in a time domain before frequency synchronization, and thus converts the received signal into a signal in a frequency domain. The received signal includes a frequency offset and interference signals of other base stations.

The signal in the frequency domain is converted into a parallel subcarrier set through the S/P converter 50.

Then, the PN despreading unit 10 performs despreading on a received signal of a specific period of a subcarrier corresponding to a target base station, using a PN sequence of the target base station, and thus obtains a first correlative value $R_0$ (see Equation 12). Also, the PN despreading unit 10 performs despreading on a received signal of a subcarrier set whose subcarrier index is smaller by 1 and a received signal of a subcarrier set whose subcarrier index is greater by 1, than the subcarrier index of the subcarrier set of the specific period, using the PN sequence of the target base station, and thus obtains second and third correlative values $R_{-1}$ and $R_1$ (see Equation 13).

The correlation ratio calculator 20 obtains a first correlation ratio $\hat{M}_0$ between the PN despread value $R_0$ for the subcarrier set of the specific period, and the PN despread value $R_{-1}$ for the subcarrier set whose subcarrier index is smaller by 1 than the index value of the subcarrier set of the specific period. Also, the correlation ratio calculator 20 obtains a second correlation ratio $\hat{M}_1$ between the PN despread value $R_0$ for the subcarrier set of the specific period, and the PN despread value $R_1$ for the subcarrier set whose subcarrier index is greater by 1 than the index value of the subcarrier set of the specific period (see Equation 14).

The offset estimator 30 estimates a frequency offset $\epsilon_i$ using Equation 18.

Figure 7:
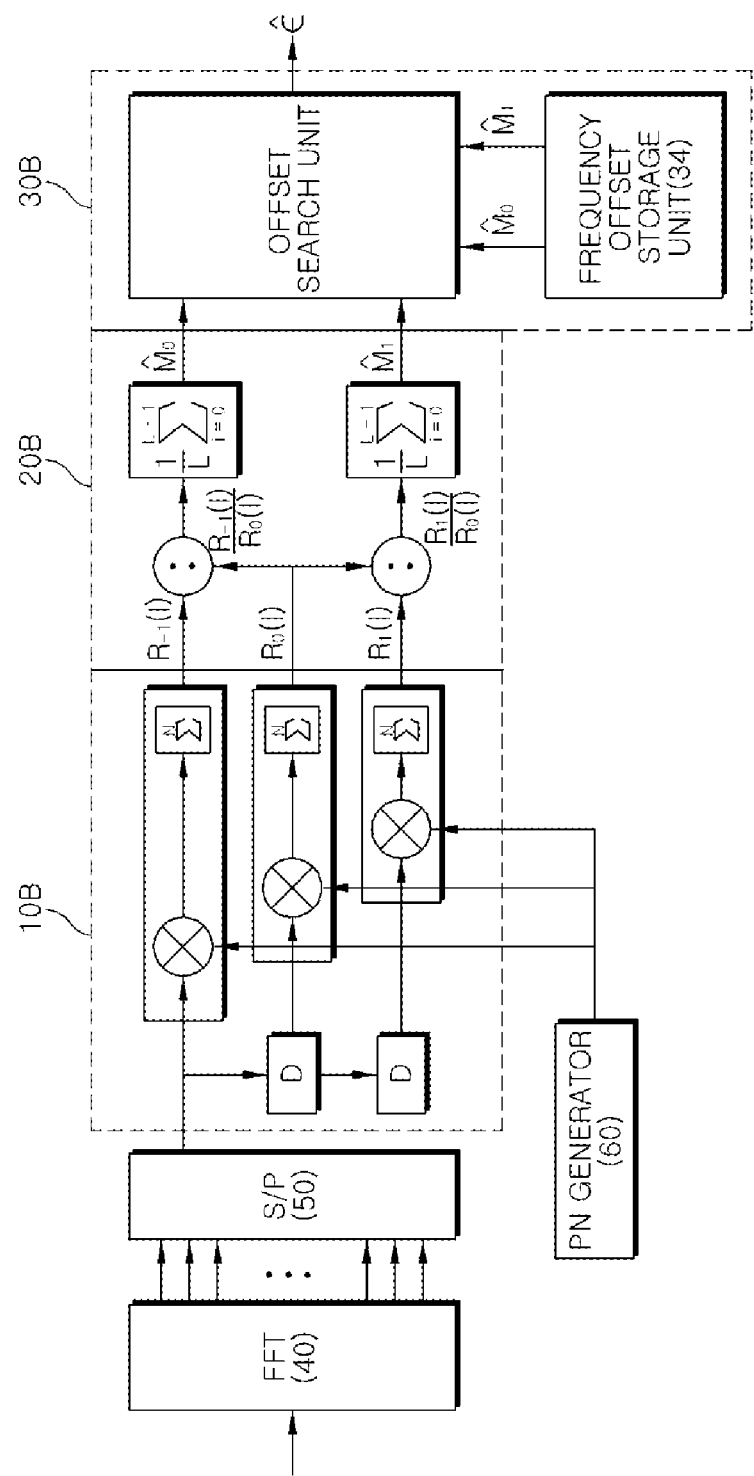
FIG. 7 illustrates another embodiment of the frequency synchronization apparatus illustrated in FIG. 6.

However, the frequency offset estimating method is not limited to this, and a variety of methods can be used to estimate the frequency offset $\epsilon_i$. FIG. 7 illustrates another embodiment of the frequency synchronization apparatus illustrated in FIG. 5.

Referring to FIG. 7, the frequency synchronization apparatus further includes a frequency offset search unit 32 and a frequency offset storage unit 34. That is, by storing correlation ratios $M_0$ and $M_1$ in advance in the frequency offset storage unit 34, and allowing the frequency offset search unit 32 to search for a value which is most approximate to the first correlation ratio $\hat{M}_0$ and the second correlation ratio $\hat{M}_1$ which are obtained by Equation 14 from the frequency offset storage unit 34, the frequency offset $\epsilon_i$ can be obtained.

Meanwhile, in order to verify effects which are obtained by the frequency synchronization method according to the present invention, a simulation test has been performed. The simulation test has been performed under the following conditions.

Wireless channel model: Flat fading channel, 2.3 G, 10 Hz Doppler Frequency

Frequency offset of a transmitting terminal of a target base station: 48 Hz

Frequency offset of a transmitting unit of the other base station; 125 Hz

Frequency offset of a receiving terminal of a base station or a wireless repeater: 1.952 Hz Power of the other base station: is set lower by −10 d/b or −20 d/b than power of the target base station Averaging a frame FL=1 or FL=4

Figure 8:
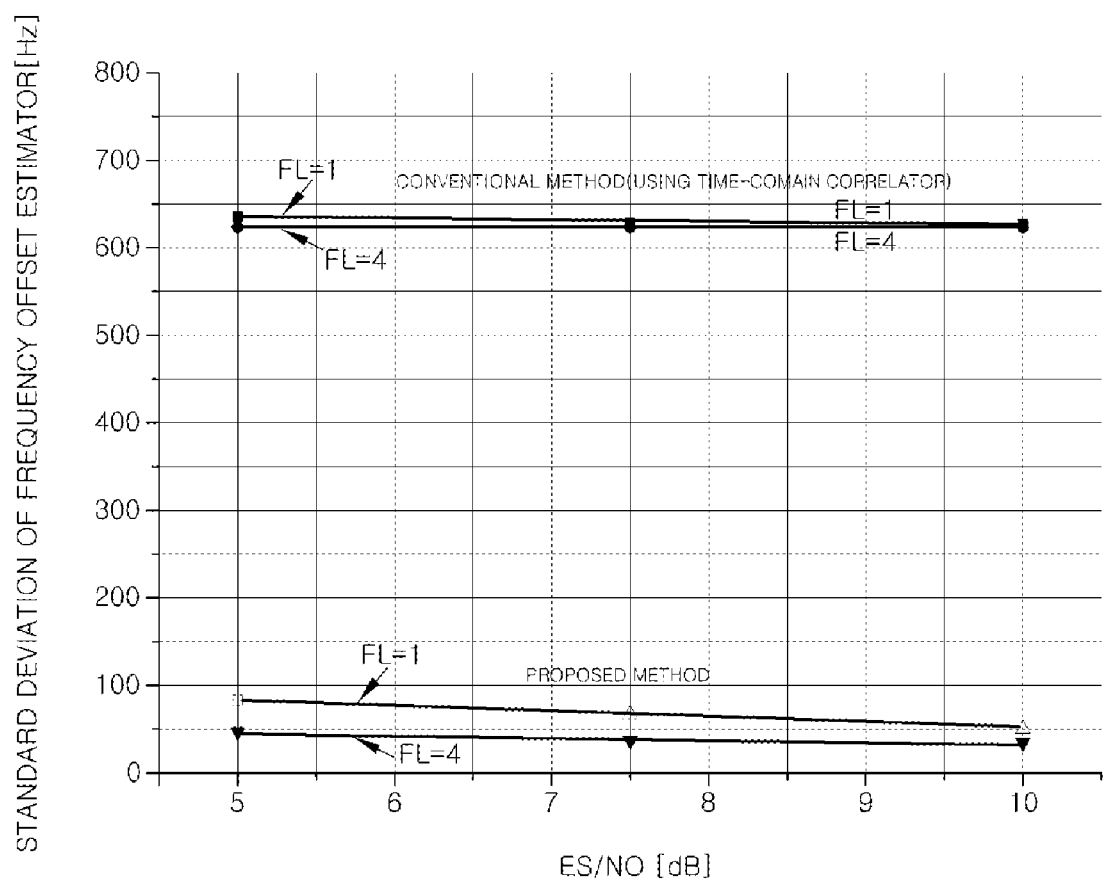
FIG. 8 is a graph plotting the standard deviation of frequency offset estimation according to a conventional method, and the standard deviation of a frequency offset estimator according to the present invention, which are obtained through a simulation test.

FIG. 8 is a graph plotting the standard deviation of frequency offset estimation according to a conventional method, and the standard deviation of a frequency offset estimator according to the present invention, which are obtained through the simulation test. Referring to FIG. 8, when frequency offsets that are estimated according to the present invention are compared with frequency offsets that are estimated according the existing Moose's method, the frequency offsets that are estimated according to the present invention satisfy the condition that standard deviation is lower than 48 Hz, which the WiBro system requires.

Accordingly, there is provided a method in which a base station or a wireless repeater of a WiBro system precisely acquires fine frequency synchronization on the basis of a WiBro frame signal which is received through a wireless channel without using a GPS receiver. In the frequency synchronization method according to the present invention, fine frequency offset estimation with relatively low complexity is possible under an environment where interference signals of other base stations or repeaters exist. By using the frequency offset estimating method according to the present invention in a base station or a wireless repeater, synchronization can be achieved without using a GPS receiver even in a hot-spot region of an inner city where signals of a plurality of other base stations or repeaters are mixed.

The frequency synchronization method according to the present invention is little influenced neither by interference signals nor by a change of a wireless channel, since synchronization of all base stations is not required which occurs interference in a downward link, and only a PN code of a target base station is used. That is, by using the correlative characteristics of PN codes, frequency synchronization offset estimation which is robust against interference signals is possible.

Accordingly, in a wireless broadband (WiBro) environment where interference signals of other base stations or repeaters exist, fine frequency offset estimation with relatively low complexity is possible. Particularly, the frequency synchronization method according to the present invention can achieve fine frequency synchronization without using a GPS receiver even in a hot-spot region of an inner city where a variety of signals are mixed.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A fine frequency synchronization method of a wireless broadband (WiBro) system without using a Global Positioning System (GPS) receiver, the method comprising:

measuring a spread degree of a received subcarrier signal adjacent to a received signal of a specific period of a subcarrier corresponding to a target base station, using orthogonality of Pseudo-random Noise (PN) sequences; and estimating a frequency offset on the basis of the spread degree of the received adjacent subcarrier signal.

2. The method of claim 1, wherein the measuring of the spread degree of the received adjacent subcarrier signal comprises obtaining correlative values of received adjacent subcarrier signals, using a PN sequence transmitted from a transmitting party, and obtaining the spread degree of the received subcarrier signal adjacent to the received signal, using ratios of the correlative values.

3. A fine frequency synchronization method of a wireless broadband (WiBro) system without using a Global Positioning System (GPS) receiver, the method comprising:

(a) performing despreading on received subcarrier sequences adjacent to a received signal of a specific period of a subcarrier corresponding to a target base station to obtain correlative values, using a Pseudo-random Noise (PN) sequence transmitted from a transmitting party;

(b) obtaining ratios of the correlative values obtained by the despreading; and
(c) estimating a frequency offset on the basis of the ratios of the correlative values.

4. A fine frequency synchronization method of a wireless broadband (WiBro) system without using a GPS receiver, the method comprising:
(a) performing despreading on received adjacent subcarrier sequences, using a PN sequence transmitted from a transmitting party; and
(b) obtaining ratios of correlative values obtained by the despreading; and
(c) estimating a frequency offset on the basis of the ratios of correlative values,
wherein operation (a) comprises:
(a1) performing despreading on a received signal of a specific period of a subcarrier corresponding to a target base station, using the PN sequence;
(a2) performing despreading on a received signal of a subcarrier set whose subcarrier index is smaller by 1 than a subcarrier index of a subcarrier set of the specific period, using the PN sequence; and
(a3) performing despreading on a received signal of a subcarrier set whose subcarrier index is greater by 1 than the subcarrier index of the subcarrier set of the specific period, using the PN sequence.

5. The method of claim 4, wherein operation (b) comprises:
(b1) obtaining a first correlation ratio between a PN despread value for the subcarrier set of the specific period, and a PN despread value for the subcarrier set whose subcarrier index is smaller by 1 than the subcarrier index of the subcarrier set of the specific period; and
(b2) obtaining a second correlation ratio between the PN despread value for the subcarrier set of the specific period, and a PN despread value for the subcarrier set whose subcarrier index is greater by 1 than the subcarrier index of the subcarrier set of the specific period.

6. The method of claim 5, wherein operation (c) comprises estimating the frequency offset using the first correlation ratio and the second correlation ratio.

7. The method of claim 4, wherein operation (c) comprises storing a first correlation ratio and a second correlation ratio for each frequency offset in advance in a memory, and searching for a frequency offset corresponding to a value which is most approximate to an input first correlation ratio and an input second correlation ratio from the memory.

8. A frequency synchronization apparatus of a wireless broadband (WiBro) system without using a Global Positioning System (GPS) receiver, the apparatus comprising:
a Pseudo-random Noise (PN) despreading unit performing despreading on received subcarrier sequences adjacent to a received signal of a specific period of a subcarrier corresponding to a target base station to obtain correlative values, using a PN sequence transmitted from a transmitting party;
a correlation ratio calculating unit obtaining ratios of the correlative values obtained by the despreading; and
an offset estimating unit estimating a frequency offset on the basis of the ratios of the correlative values.

9. A frequency synchronization apparatus of a WiBro system without using a GPS receiver, the apparatus comprising:
a PN despreading unit performing despreading on received adjacent subcarrier sequences, using a PN sequence transmitted from a transmitting party;
a correlation ratio calculating unit obtaining ratios of correlative values obtained by the despreading; and
an offset estimating unit estimating a frequency offset on the basis of the ratios of correlative values,
wherein the offset estimating unit estimates the frequency offset, using a first correlation ratio between a PN despread value for a subcarrier set of a specific period and a PN despread value for a subcarrier set whose subcarrier index is smaller by 1 than a subcarrier index of the subcarrier set of the specific period, and a second correlation ratio between the PN despread value for the subcarrier set of the specific period and a PN despread value for a subcarrier set whose subcarrier index is greater by 1 than the subcarrier index of the subcarrier set of the specific period.

10. A frequency synchronization apparatus of a WiBro system without using a GPS receiver, the apparatus comprising:
a PN despreading unit performing despreading on received adjacent subcarrier sequences using a PN sequence transmitted from a transmitting party;
a correlation ratio calculating unit obtaining ratios of correlative values obtained by the despreading; and
an offset estimating unit estimating a frequency offset on the basis of the ratios of correlative values,
wherein the offset estimating unit stores a first correlation ratio between a PN despread value for a subcarrier set of a specific period and a PN despread value for a subcarrier set whose subcarrier index is smaller by 1 than a subcarrier index of the subcarrier set of the specific period, and a second correlation ratio between the PN despread value for the subcarrier set of the specific period and a PN despread value for a subcarrier set whose subcarrier index is greater by 1 than the subcarrier index of the subcarrier set of the specific period, in advance, in a memory, and searches for a value which is most approximate to a first correlation ratio and a second correlation ratio which are input to the offset estimating unit, from the memory, thereby obtaining the frequency offset corresponding to the result of the searching.

* * * * *